Oct. 19, 1943.   J. A. DA CUNHA   2,331,963
APPARATUS FOR THE MANUFACTURE OF RUBBER OVERSHOES
Filed May 31, 1939   2 Sheets-Sheet 1

Inventor
JOÃO ANTONIO DA CUNHA

By Haseltine, Lake & Co.
Attorneys

Patented Oct. 19, 1943

2,331,963

UNITED STATES PATENT OFFICE 2,331,963

APPARATUS FOR THE MANUFACTURE OF RUBBER OVERSHOES

João Antonio da Cunha, Rio de Janeiro, Brazil

Application May 31, 1939, Serial No. 276,542

1 Claim. (Cl. 18—42)

This invention refers in general to the manufacture of rubber overshoes or galoshes, but its object in particular is to provide an apparatus for the manufacture of boot-like overshoes of the type known as "snow-boots," whereby considerable advantages are obtained in comparison to similar known processes of manufacture insofar as concerns economy of time and labor, as well as with respect to the excellency of the material which can be used in the manufacture of said over-shoes or snow-boots.

The snow-boots nowadays manufactured by the usual processes are made of fabric covered with a layer of rubber or else are formed in one piece cut out from waterproof material by means of a simple wooden last and therefore, they have to undergo a number of successive operations: the buttons for buttoning up around the wearer's leg are added subsequently that is, fixed separately. Besides, such snow-boots are comparatively heavy, opaque and crude and only adapt themselves fittingly to footwear of size or "number" which is equal to it, for the anatomic shape is determined by the foot itself.

The apparatus according to the present invention eliminates the drawbacks pointed out above. In fact, the snow-boot manufactured by the present apparatus is made of one single solid piece of rubber without any fabric and formed integrally with the vamp as well as the buttons and button-holes to fasten the boot on the foot, with the additional advantage of being manufactured by continuous operation, that is, by a single operation which takes only four minutes, from which accrues a considerable economy in time and labor and therefore a greater efficiency of production. Besides this, the snow-boot of the present invention is extremely thin and light, it may be made transparent and is adaptable to fit footwear of slightly smaller size or "number" or slightly larger than its own "number" without any prejudice to its anatomic shape which is obtained during vulcanisation and not by referring to the foot.

The invention is illustrated in the accompanying drawings in which.

Figure 1:
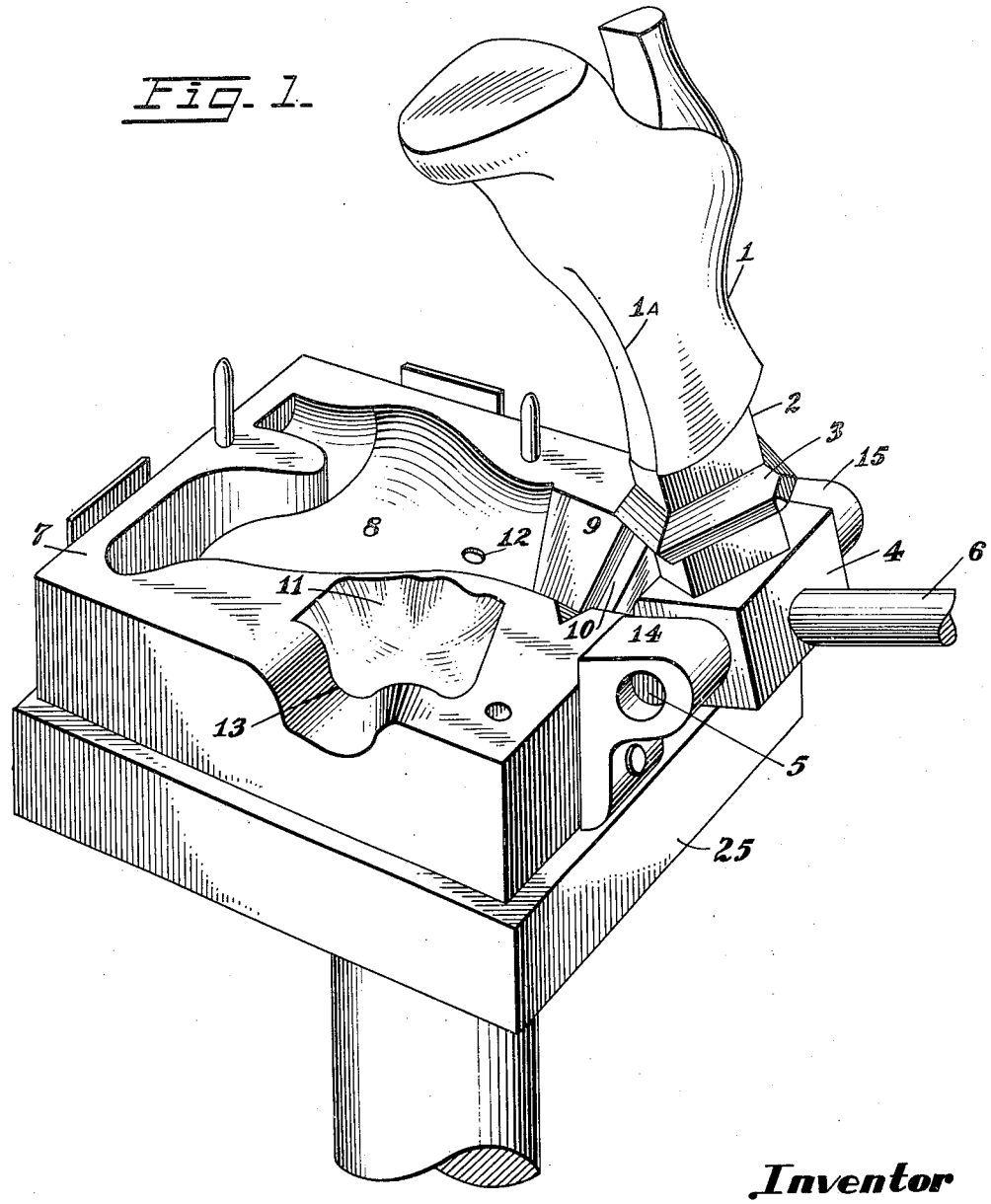
Fig. 1 is a perspective view of the last used in forming the snow-boot in accordance with the invention; and includes the lower half-mold which cooperates with the last.
Figure 2:
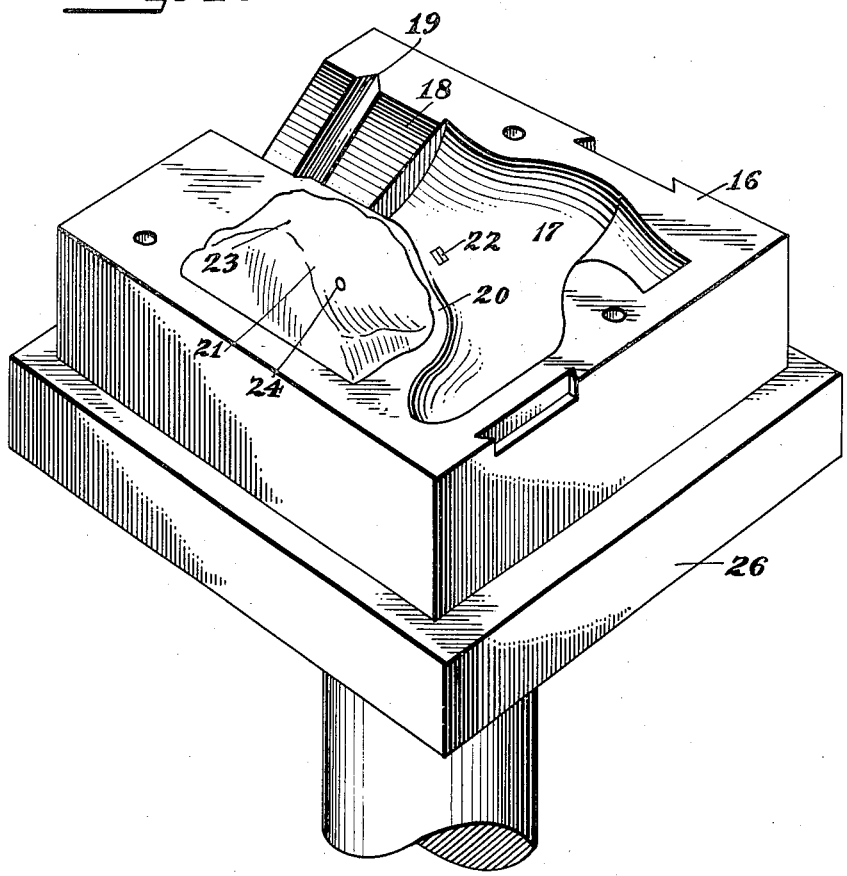
Fig. 2 shows, in bottom plan view, the upper half-mold which cooperates with the lower half-mold and with the last of Fig. 1.

The invention is carried out in practice by means of a last of steel or the like, Fig. 1, in combination with a lower half-mold, and an upper half-mold, Fig. 2, conveniently mounted respectively on the lower, movable plate and on the upper, fixed plate, of a common high-pressure press.

The abovementioned steel or similar last comprises essentially: a solid metal part 1 corresponding to the foot, heel and leg of the boot to be formed; a guiding support 2 which is preferably prismatic but may also have some other suitable shape, and is integral with the last 1; a central frieze 3 which is formed transversely to and integrally with the guiding support 2; a solid block 4 with a transverse bore 5 which is to serve as a swingable core so as to permit certain movements and adjustments to the last 1 in the manner to be described hereafter and which is made in one piece with the guiding support 2; a handle 6 formed integrally with the core or core block 4 and projecting from the front part of said core; and finally, a rib 1A which is used to cut a slit in the leg of the boot so as to facilitate putting it on.

Half-mold 7 mounted on and secured to the lower, movable plate 25 of a common press, comprises: a recess 8 whose contours are exactly like the contours of the foot, heel and leg of part 1 of the steel or like last, but so much larger as is necessary to keep it spaced from the solid part, at a distance of 0,7 mm. (0,02756 inch.) corresponding to the wall thickness of the boot upon vulcanization; an angular part 9 which is also recessed and consists of two sloping and opposed surfaces corresponding to two of the four surfaces which make up the guiding support 2 and serve as a rest or bed for this support for the purpose to be set forth hereafter; a transverse notch or groove 10 cut into the angular recess 9 and of a shape identical to that of frieze 3 for which it serves as a rest as also explained hereunder; a slightly recessed part or supplemental half-mold 11 whereby a vamp is molded on the leg of the boot enabling the buttoning up of the boot on the wearer's leg, which vamp is disposed or formed on one of the longitudinal sides of the leg of part 1 of the steel last, said half-mold 11 containing a small vertical peg 12 and several radial corrugations 13 for the purposes set forth hereafter; and two pieces of iron or other suitable material 14 and 15, perforated transversely and mounted parallelly on the front wall of the half-mold so as to support rotatively, by means of a bolt between them, the core 4 of the steel last.

The upper half-mold 16, Fig. 2, which is mounted on and secured to the upper, fixed plate 26 of the press, comprises: the recesses 17 and 18 exactly like recesses 8 and 9 of the lower, movable half mold; the notch 19 which is also like the notch 10 of the lower mold; a longitudinal rib with a fine edge 20 cooperating with the similar rib 1A mentioned above in order to slit open as—already stated—the boot-leg as formed, thus facilitating the putting on of the boot; a part with two concave recesses or supplemental half-mold 21 for molding the vamp and like the supplemental half-mold 11 of the lower half-mold 7, which half-mold 21 includes a smal transverse rib 22 whereby a button-hole is made in the vamp of the snow-boot during manufacture, and several radial corrugations 23 similar to the corrugations 13 of the lower supplemental mold 11; an aperture 24 in the part corresponding to the leg for making the button.

Upon operation and after the mold 8 has received the plain plastic rubber, that is, without any additional fabric, the operator grips the handle 6 and makes the last 1 enter said mold 8 by a rotation of the last for which purpose the core 4 is firmly and rotatably secured between the lateral supports 14 and 15. After the steel or similar last is thus placed in half-mold 8, two sides of the guiding support 2 sit with precision and without any play on the angular rest having opposed, sloping surfaces 9, and the frieze 3 of this support fits also precisely and without play into notch 10. When the common high pressure press is made to operate, the lower half-mold, Fig. 1, meets the upper half-mold, Fig. 2, with resultant high pressure for the ordinary process of vulcanization. With this pressure, the angular part 18 and the notch 19 of the upper half-mold, Fig. 2, exert, assisted by angular part 9 and transverse notch 10, a pressure upon the guiding support 2 provided with four surfaces, Fig. 1, and under these circumstances, it is evident that the steel last 1 is absolutely prevented from making even the slightest movement lengthwise, laterally or in a vertical direction.

The principal characteristic feature of the invention lies first of all in the function of core 4 and the perfectly centered position of this core relatively to the lower half-mold 7 mounted on the lower and movable plate of the press, and secondly, in the absolutely uniform thickness of the rubber of the boot as formed, which is achieved by the special disposition of the said core 4 and by the guiding support 2. Put more precisely, due to core 4 and guiding support 2 of the steel last, Fig. 1, this last remains absolutely in the exact center of the lower half-mold 7 and upper half-mold 16. In this way, after pressure is brought to bear as described above by the lower movable plate of the press upon the upper fixed plate thereof, the two upper and lower half-molds 7 and 16 and the two upper and lower supplemental molds 11 and 21 press simultaneously and without deviation in the slightest degree upon the plastic rubber which involves part 1 of the steel last as well as on the rubber which is to constitute the vamp, such pressure on the rubber being necessarily absolutely equal at all points, there being consequently not the slightest discrepancy in the thickness previously determined by the manufacturer which thickness consists in the difference between the size of the steel last, Fig. 1, and the thickness of half-molds 7 and 16 in both figures. While pressure is exerted as just described, the longitudinal rib 20 of upper half-mold 16 cooperating with rib 1A of the steel last, slashes the boot in process of making by cutting a suitable slit which permits the easy putting on of this boot. The transverse rib 22, also provided on half-mold 16, opens a button-hole in the vamp of the boot. A button-hole is also formed in the vamp of the boot by peg 12 of supplemental half-mold 21, assisted by rib 22, and the upper and lower corrugations 13 and 23 cooperate in forming on the vamp a series of radial corrugations for the purpose of facilitating the perfect adjustment of the snow-boot on the shoe and around the wearer's foot by means of the vulcanized rubber button which is an integral part of the boot-leg and formed by aperture 24.

It should be noted that the core 4 still performs another very important function in the assembly according to the present invention.

After the snow-boot to be manufactured has been molded and vulcanized and after the lower plate of the press is brought back to the starting position in the usual manner, the core 4 is made to rotate in an outward direction by any suitable manual or mechanical means and thus causes the steel last to rise compelling it to describe an arc until completely outside the press, but still remaining connected to the lower half-mold 7. In this way, the operator is able to quickly withdraw from the steel last the boot which is ready and replace immediately the same last into its half-mold for starting the operation anew.

It is of course understood that the present invention may be modified according to circumstances both in its general construction and as regards the various parts thereof within the limits and scope of the principles set forth in the annexed claim.

Now, what I claim is:

Apparatus for manufacturing in a single continuous operation, a complete seamless and a lining-free rubber overshoe provided with a slit, a vamp integral with the leg portion of the overshoe and at least one button and corresponding button hole, said apparatus comprising relatively movable upper and lower platens, a mold half secured to each platen, each mold half having complementary main recesses, together defining a main mold cavity for forming the leg, heel and foot of the overshoe, and auxiliary recesses forming an auxiliary cavity communicating with the leg forming portion of the main cavity for forming the vamp, said auxiliary recesses having a plurality of corrugations for forming corrugations on the vamp which allow adjustment of said overshoe to suit various sizes of feet and legs, a recess in the main cavity of one mold half for forming a button on one of the upper side parts of the overshoe, a corresponding projection in the auxiliary recess of the other mold half for forming a button hole for said button on said vamp, a rib on one of the mold halves disposed parallel to the parting plane of the mold halves for producing a slit in the leg of the overshoe, a metal last adapted to be positioed in the main mold cavity, said last having a conventional core portion corresponding to the leg, heel and foot of an overshoe to be formed, a guiding portion beyond the leg portion and a support for said core portion and guiding portion beyond said guiding portion, said support comprising a member provided with a lever and pivotally secured to the lower mold half.

JOÃO ANTONIO DA CUNHA.